Aug. 31, 1965   C. ALINARI   3,203,244

DEPTH METER FOR DIVING PURPOSES

Filed Oct. 15, 1962

United States Patent Office 3,203,244
Patented Aug. 31, 1965

3,203,244
DEPTH METER FOR DIVING PURPOSES
Carlo Alinari, 4 Via Giusti, Turin, Italy
Filed Oct. 15, 1962, Ser. No. 230,597
Claims priority, application Italy, Nov. 10, 1961,
20,229/61
9 Claims. (Cl. 73—300)

This invention relates to a depth meter for diving purposes, which is an instrument adapted to supply a reading of the distance from the surface of the water in which the instrument is placed.

Instruments of this kind are actually pressure gauges which measure the difference in pressure between the fluid in which they are immersed, in the specific case water, and outer atmosphere. As is well known, this difference in pressure is proportional to the diving depth so that, when the instrument is graduated in meters or other linear measure units, it directly supplies a reading of the diving depth.

Among the various types of pressure gauges, metal pressure gauges, more particularly those of the tubular spring or membrane type have been found particularly suitable for use as depth meters for submarine use.

However, such pressure gauges, which shall be referred to in the following description and appended claims as pressure gauges of the type referred to, suffer in use as depth meters, more particularly in sea water, from a serious drawback residing in the fact that salt water in contact with the metal parts of the instrument definitely injures them in a relatively short time making the instrument unfit for use.

The object of this invention is to provide a depth meter of the type referred to which is free from the abovementioned drawback, in that its gauge is out of direct contact with the fluid in which said meter is immersed, and the casing is made of non-corrodible material.

A further object is to provide a depth meter resistant to shocks against rocks, underwater objects, etc. Another object is to provide a reliable depth meter which is of light weight and which comprises a minimum number of parts whereby said meter may be produced at minimal cost.

The improved depth meter comprises a pressure gauge of the type referred to, enclosed by a sealed casing filled with a non-corrosive liquid, at least a portion of said casing being elastically deformable, whereby the pressure of the fluid in which the depth meter is immersed is transmitted to the non-corrosive liquid acting directly on said pressure gauge.

The casing may for instance be made of plastic including rubber, or other flexibly deformable material its deformable portion being in the form of a portion of its surface having reduced thickness and forming a diaphragm which may be corrugated for more efficient transmission of the pressure to the inside of the casing. The casing might be made of any other suitable material of a water-proof nature, having a deformable portion which may be in the form of a diaphragm made of rubber or other elastomer.

A further advantageous feature of the improved depth meter resides in the fact that the non-corrosive liquid within the casing, can be an oil which serves at the same time for lubricating the movable instrument portions, thereby causing them to move more smoothly.

Further characteristic features and advantages of the depth meter according to this invention will be understood from the following description of an embodiment thereof given by way of illustration and not of limitation, with reference to the accompanying diagrammatical drawings; wherein.

Figure 1:
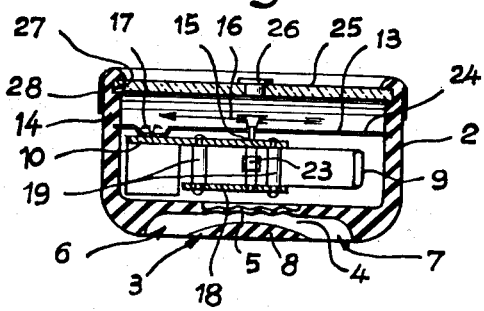
FIGURE 1 is a middle vertical sectional view of the improved depth meter.
Figure 2:
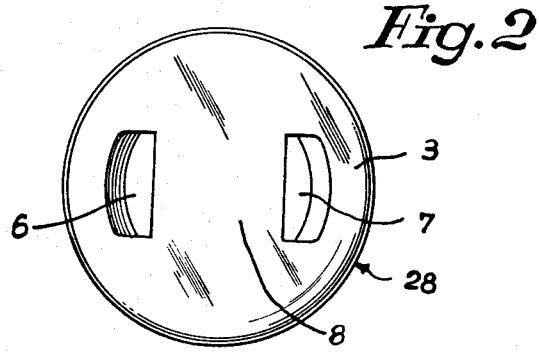
FIGURE 2 is a plan view from below of the depth meter according to FIGURE 1.
Figure 3:
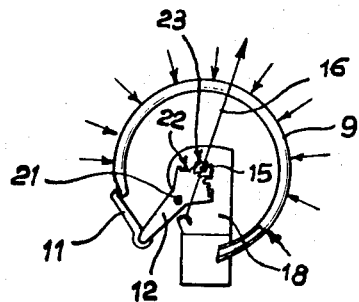
FIGURE 3 is a plan view of the pressure gauge of the depth meter according to FIGURES 1 and 2.

The depth meter comprises a rigid casing 2 of a non-brittle material such as plastic, rubber or the like which is not affected by water, of a generally cylindrical form, closed at one end by a bottom 3 and open at its other end. A channel-shaped chamber 4 is formed within the bottom 3 and extends transversely within said bottom. The channel 4 communicates with the outside through two openings 6, 7, respectively, provided in each end, of an outer rigid wall 8 of said channel 4. A strap (not shown) extends through the two openings 6 and 7 into the chamber 4 for securing the instrument to the diver's wrist.

The middle portion of the inner wall of the chamber 4 is reduced in thickness to form a corrugated diaphragm 5 integral with the case 2. The easily deformable diaphragm 5 acts as a surface transmitting the outer pressure to which the instrument is exposed to the inside of the case 2. This is the pressure to be measured on diving and is exerted by the water entering the chamber 4 through the openings 6, 7.

Arranged within the case 2 is the pressure gauge comprising a Bourdon tube 9.

A dial face 13 of the instrument, which is in the form of a circular metal plate and is graduated in meters is fitted to the inside of the case 2 parallel with the bottom 3 of the latter and is retained in a desired spaced relationship to the bottom in a circumferential groove formed within a cylindrical wall 14 of the case 2. As can be seen in FIG. 1, the pressure measuring portion of the gauge is suspended from the dial face 13 so that it does not touch any part of the casing. Since the casing chamber 4 is filled with oil, any shocks received by the casing 2 are dampened considerably before they reach the instrument.

A plate 10 supporting the movable instrument members is secured beneath the dial 13 by means of a screw 17. A further plate 18 extends in a parallel spaced relationship to the former to which it is rigidly connected by two pillars 19. The plates 10 and 18 support a rotational pivot 15 for a pointer 16 of the depth meter and a rotational pivot 21 for an operating lever 12 for the pointer 16 on the instrument.

The Bourdon tube formed by an arcuate metal tube 9 of an elliptical cross-sectional shape is secured at one end to the plate 10. Its other end is articulated by means of a link 11 to the end of a lever 12 pivoted at 15, the other end of which of a toothed-sector shape 22 meshes with a set of teeth 23 intermediate the plates 10 and 18. Compression and expansion of the tube 9 therefore rotate the pointer 16 through the above described transmission.

The pressure gauge in the case 2 is fully immersed in a non-corrosive liquid, such as light lubricating oil; a hole 24 in the dial 13 promotes penetration of oil beneath the dial within the case.

The case 2 enclosing the depth meter is tightly closed at the top by a glass 25 retained in a circumferential groove 27 within the wall 14 of the case 2 at the top edge of the latter. A metal rim 28 fitted externally of the wall 14 clamps the edge of the case 2, against the glass 25 preventing the latter from slipping out of the groove 27 and affording a tight seal of the case 2. Rim 28 necessarily also helps retain dial face 13 within its groove. A plug 26 in the middle of the glass 25 is provided for filling the case with oil after assembly of the glass. The dial face 13 and plate 25 are inserted in the circumferential grooves in wall 14 by first spreading the sides of wall 14 apart; then the dial face and plate are positioned within the groove, and the sides of wall 14 are then released whereby they resiliently snap back into normal position and firmly grip the circumferential edge of the dial face and plate within the respective grooves. As can be seen from FIG. 1, each groove comprises upper and lower radial shoulders which prevent any axial movement of the members held with the grooves. The wall 14 flexibly bends about the integral joint formed at the meeting between the wall 14 and the bottom 3.

It has already been mentioned that casing 2 can be made of plastic, including rubber. It will be seen from FIGURE 1 that the casing 2 comprises a one-piece integrally formed member. It is obvious that such a member can advantageously be formed by a simple plastic molding process.

The advantages of the device when so made are:
(a) It is lightweight as compared to metallic meters;
(b) It is non-corrodible;
(c) It does not require sealing means around the diaphragm where it is integrally formed in one-piece construction;
(d) It does not transmit shocks as sharply as metallic meters, the plastic case being more shock absorbent than metal;
(e) It is much cheaper to produce since it has a minimum of separate parts and therefore requires minimum effort of assembly.

The depth meter operates as follows.

The pressure of water into which the depth meter is immersed, acts on the case 2. The outer pressure transmitted to the inside of the case 2 by the deformable diaphragm 5 acts through the oil which wholly fills the case on the outside of the metal tube 9. The metal tube 9, which is resiliently deformable and is closed at both ends, is filled with air at atmospheric pressure. Collapsing of the tube 9, due to difference between the fluid pressure outside the case deriving from diving and the pressure prevailing within the tube, rotates the pointer 16 by an extent proportional to the diving depth. The graduated dial 13 supplies a direct reading of the depth.

In addition to acting as an intermediate fluid for transmission of pressure to the instrument, the oil in which the depth meter is immersed acts as a lubricant thereby affording a smoother running of the various parts of the depth meter.

Many modifications in arrangement and shape of the individual parts of the instrument can be made without departing from the scope of this invention.

What I claim is:
1. A fluid depth meter comprising a casing which defines a hollow chamber, the casing being made of flexibly deformable material, such as plastic or the like, and comprises a concentric side wall and a bottom wall, said bottom wall including an integral diaphragm, said side wall including spaced peripheral grooves on the inner surface thereof, a transparent member sealing one end of said chamber in fluid tight relationship with the exterior thereof, said transparent member being peripherally held in one of said grooves, a Bourdon gauge within said chamber, said Bourdon gauge comprising a dial face which is peripherally held in another of said grooves, said concentric side wall being radially outwardly displaceable to an extent whereby said transparent member and said dial face may be withdrawn from their respective grooves, said side wall also being resiliently returnable to a position whereat said transparent member and dial face peripherally fit within said grooves, an incompressible fluid filling said chamber, said integral diaphragm of said casing being relatively thin and the remainder of the bottom wall and concentric side wall of said casing being relatively thick, said diaphragm being of one piece construction with the bottom wall, being flexibly deformable, and having one side thereof exposed to the exterior of said chamber.

2. The meter of claim 1, wherein one end of said side wall forms an integral joint with the outer periphery of said bottom wall, said side wall being outwardly displaceable by virtue of its being resiliently bendable about said joint.

3. The meter of claim 2, comprising a metal rim around said side wall, said rim restricting outward bending of said side wall about said joint.

4. The meter of claim 1, comprising a metal rim around said side wall, said rim restricting outward displacement of said side wall.

5. The meter of claim 1, wherein said Bourdon gauge comprises a pressure measuring device suspended from said dial faces in spaced relationship to said side wall and bottom wall, said measuring device being suspended within said fluid.

6. The meter of claim 1, wherein said casing comprises a one-piece plastic molding.

7. The meter of claim 1, wherein said bottom wall comprises a relatively thick peripheral portion radially surrounding said diaphragm, a cover portion integral said peripheral portion, means defining a channel shaped chamber under the bottom portion under the cover portion and communicating through openings to the outside of the casing, a portion of the inner wall of said chamber including said diaphragm having a corrugated face.

8. The meter of claim 7, wherein said casing is a one-piece integrally molded plastic member.

9. The meter of claim 7, wherein said channel shaped chamber and openings are shaped and positioned to receive a strap therethrough.

References Cited by the Examiner
UNITED STATES PATENTS

| | | | |
|---|---|---|---|
| 2,773,388 | 12/56 | Prosser | 73—431 |
| 2,935,873 | 5/60 | Stewart | 73—300 |
| 3,143,885 | 8/64 | Waite et al. | 73—431 |

LOUIS R. PRINCE, *Primary Examiner.*

JOSEPH P. STRIZAK, RICHARD QUEISSER,
*Examiners.*